US00RE41827E

(19) United States
(12) Reissued Patent
Kon

(10) Patent Number: US RE41,827 E
(45) Date of Reissued Patent: Oct. 19, 2010

(54) ELECTROMAGNETIC ACTUATOR

(75) Inventor: Hirozumi Kon, Tochigi (JP)

(73) Assignee: Keihin Corporation, Tokyo (JP)

(21) Appl. No.: 11/987,921

(22) Filed: Dec. 5, 2007

Related U.S. Patent Documents

Reissue of:
(64) Patent No.: 6,972,500
Issued: Dec. 6, 2005
Appl. No.: 10/808,608
Filed: Mar. 25, 2004

(30) Foreign Application Priority Data

Mar. 26, 2003 (JP) ..... 2003-084859
Mar. 26, 2003 (JP) ..... 2003-084860
Mar. 26, 2003 (JP) ..... 2003-084861

(51) Int. Cl.
*H02K 41/00* (2006.01)

(52) U.S. Cl. ..... 310/14; 310/30; 267/140.14
(58) Field of Classification Search ..... 310/17, 310/23, 30, 14; 267/140.14, 141, 140.11, 267/140.12, 140.13, 140.15, 140.3, 140.4
See application file for complete search history.

(56) References Cited

U.S. PATENT DOCUMENTS 4,552,417 A 11/1985 Yamashita et al.
5,344,129 A 9/1994 Ide et al.
5,739,599 A 4/1998 Murai
5,828,144 A 10/1998 Murai
5,905,317 A 5/1999 Aoki
6,242,831 B1 6/2001 Khan
6,254,069 B1 7/2001 Muramatsu et al.
6,422,546 B1 7/2002 Nemoto et al.
6,565,072 B2 * 5/2003 Goto et al. ..... 267/140.14
6,631,895 B2 10/2003 Nemoto
6,641,120 B2 11/2003 Nemoto
6,822,356 B2 11/2004 Suzuki et al.
6,972,500 B2 12/2005 Kon et al.
6,994,332 B2 2/2006 Goto et al.
7,066,454 B2 6/2006 Kon et al.
7,157,821 B2 1/2007 Kon et al.
2004/0070126 A1 * 4/2004 Nemoto ..... 267/140.14

FOREIGN PATENT DOCUMENTS

JP 58-34582 8/1981
JP 56-162613 12/1981
JP 6-66288 9/1994
JP 09-049541 2/1997
JP 2001-1765 1/2001
JP 2002-199688 7/2002
JP 2002-272080 9/2002
JP 2003-021189 A 1/2003
JP 2003-49894 2/2003

OTHER PUBLICATIONS

Co–Pending U.S. Appl. No. 12/054,031, Tahara et al., filed Mar. 24, 2008.

* cited by examiner

*Primary Examiner*—Nguyen N Hanh
(74) *Attorney, Agent, or Firm*—Arent Fox LLP

(57) ABSTRACT

An electromagnetic actuator includes a fixed core supported by a bottom wall of a housing, a movable core arranged opposite to the fixed core via an air gap to drive the movable member, and coil assembly supported by the housing to surround both the cores, wherein the movable member and the movable core are connected by connecting means for adjusting the air gap between the fixed core and the movable core, and wherein an adjustment operating hole through which the connecting means is adjusted is provided on the fixed core so as to be opened outside the bottom wall of the housing. Thus, it is possible to freely adjust the air gap between the fixed core and the movable core without preparing several types of connecting members.

12 Claims, 8 Drawing Sheets

ELECTROMAGNETIC ACTUATOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an electromagnetic actuator having: a fixed core supported by a bottom wall of a housing made of magnetic material; a movable core arranged opposite to the fixed core via an air gap to drive a movable member; and coil assembly comprising a bobbin supported by the housing to surround the fixed and movable cores, and a coil wound around the bobbin.

2. Description of the Related Art

Such an electromagnetic actuator is already known as disclosed in, for example, Japanese Patent Application Laid-Open No. 2001-1765.

In the electromagnetic actuator, characteristics of the movable member concerning thrust and displacement are dependent on an initial air gap between attracted surfaces of the fixed and movable cores, but the initial air gap may not be within the tolerance due to accumulated manufacturing errors of each part of the actuator. In the conventional one, for such an occasion, several types of coupling members with different length for coupling the movable member to the movable core have been prepared in advance and the air-gap has been adjusted by replacing, the coupling member.

However, such adjustment means for air gaps requires several types of coupling members, and moreover takes time and efforts in the replacement operation, so that the cost is inevitably increased.

SUMMARY OF THE INVENTION

The present invention has been achieved in view of the above-described circumstances, and has an object to provide a low-priced electromagnetic actuator capable of freely adjusting an air gap between fixed and movable cores without preparing various types of coupling members.

In order to achieve the above-described object, according to a first feature of the present invention, there is provided an electromagnetic actuator comprising; a fixed core supported by a bottom wall of a housing made of magnetic material; a movable core arranged opposite to the fixed core via an air gap to drive a movable member; and a coil assembly comprising a bobbin supported by the housing to surround the fixed and movable cores, and a coil wound around the bobbin, wherein the movable member and the movable core are coupled by coupling means for adjusting the air gap between the fixed core and the movable core, and wherein an adjustment operating hole through which the coupling means is adjusted is provided on the fixed core so as to be opened outside the bottom wall of the housing.

With the first feature, by operating the coupling means, it is possible to freely adjust an air gap between the fixed core and the movable core, thereby imparting a desired vibration isolation characteristic to an active type vibration isolating support system. Therefore, the air gap is easily adjusted, and moreover there is no need for preparing various types of components having different dimensions in order to adjust the air gap, whereby the cost can be reduced. Moreover, since the coupling means is operated through the adjustment operating hole of the fixed core which is opened outside the housing, it is possible to accurately adjust the air gap without regard to assembly errors in each part after the completion of assembly of the actuator, thereby easily providing a high-quality actuator.

In addition to the first feature, according to a second feature of the present invention, the fixed core is integrally formed with a positioning shaft in which the adjustment operating hole is opened on an outer end surface and with a flange-shaped first yoke which protrudes from the outer periphery of the fixed core to be arranged opposite to one end surface of the coil assembly; the positioning shaft is fitted and fixed into a positioning hole provided at the bottom wall of the housing; the first yoke is brought into close contact with an inner surface of the bottom wall to surround the movable core; and a second yoke arranged opposite to the other end surface of the coil assembly is continuously provided to the housing.

With the second feature, although the fixed core becomes hollow because it has the adjustment operating hole, a positioning shaft integral with the fixed core is fitted and fixed to the positioning hole in the bottom wall of the housing, and the flange-shaped first yoke is brought into close contact with the bottom wall, whereby the fixed core is firmly reinforced to become capable of withstanding an abutting shock which the fixed core receives from the movable core and suffers no position shift. Moreover, the first yoke effectively increases magnetic paths around the coil assembly in cooperation with the housing and the second yoke, thereby increasing the attracting force between the fixed and movable core.

Further, in addition to the second feature, according to a third feature of the present invention, the bobbin is continuously provided with a coil cover which covers the outer periphery of the coil to seal the coil to the bobbin; the housing is arranged so that its bottom wall faces downward; and between the first yoke and the other end surfaces of the bobbin and the coil cover, there is interposed an elastic plate which water tightly comes into close contact with their opposite surfaces.

With the third feature, by elastically holding the coil assembly on the housing through use of the elastic plate, it is possible to enhance its vibration resistance. Moreover, even when water accumulated in the bottom part of the housing, the coil is waterproofed by the elastic plate, thereby greatly contributing to improvement in durability of the coil.

Further, in addition to the first feature, according to a fourth feature of the present invention, the fixed core is integrally formed with a flange-shaped first yoke which protrudes from an outer periphery of the fixed core to be arranged opposite to one end surface of the coil assembly and which is supported on the bottom wall of the housing; a second yoke which surrounds the movable core and is arranged opposite to the other end surface of the coil assembly is fixed to the housing; a tube-shaped bearing member which slidably supports the movable core is slidably fitted in the second yoke; and a set spring is provided in a compressed state between the second yoke and an outward flange which is formed at a lower end of the bearing member and which is supported on the first yoke, thereby biasing the outward flange toward the first yoke.

With the fourth feature, a stable operation of the movable core can be secured by the bearing member. Moreover, with very simple structure in which a set spring is provided in a compressed state between the outward flange of the bearing member and the second yoke, the bearing member can be installed at a fixed position, whereby no high precision is needed for the installation and the cost can be reduced.

Also, according to a fifth feature of the present invention, there is provided an electromagnetic actuator comprising: a fixed core supported by a bottom wall of a housing made of magnetic material; a movable core arranged opposite to the fixed core via an air gap to drive the movable member; a coil assembly comprising a bobbin supported by the housing to surround the fixed and movable cores, and a coil wound around the bobbin; and a tube-shaped bearing member disposed inside the coil assembly to slidably support the movable core, wherein a first yoke for holding the coil assembly in corporation with the bottom wall is continuously provided to the housing; wherein the bearing member is slidably fitted in the first yoke; wherein a supporting portion for supporting an outward flange formed at one end of the bearing member is provided on the bottom wall; and wherein a set spring for biasing the outward flange toward the supporting portion is provided in a compressed state between the outward flange and the first yoke.

With the fifth feature, since the set spring of the bearing member is arranged on the outer periphery side of the bearing member, even if abrasion powder is produced between the set spring and a portion against which the set spring abuts under pressure, it is possible to prevent the abrasion powder from entering the bearing member, thereby securing smooth sliding of the movable core. Also, since a repulsion force of the set spring is supported on the first yoke continuing to the housing and is not exerted on the movable core, it is possible to prevent any loss of an effective attracting force between the fixed and movable cores due to the repulsion force of the set spring, thereby improving the output performance of the movable core.

Also, in addition to the fifth feature, according to a sixth feature of the present invention, the fixed core is integrally formed with a positioning shaft fitted and fixed in a positioning hole provided on the bottom wall and with a second yoke which comes into close contact with an inner surface of the bottom wall and opposes to the first yoke with the coil assembly sandwiched therebetween, and the second yoke constitutes the supporting portion.

With the sixth feature, the fixed core is reinforced by fitting and fixing the positioning shaft integral therewith in the positioning hole in the bottom wall of the housing and by bringing the second yoke into close contact with the bottom wall. Therefore, the fixed core is capable of withstanding an abutting shock which the fixed core receives from the movable core, and further the fixed core suffers no position shift. Moreover, the second yoke is capable of effectively increasing magnetic paths around the coil assembly in cooperation with the housing and the first yoke, thereby increasing the attracting force between the fixed and movable cores.

Also, according to a seventh feature of the present invention, there is provided an electromagnetic actuator comprising: a fixed core supported by a bottom wall of a housing made of magnetic material; a movable core arranged opposite to the fixed core via an air gap to drive a movable member; and a coil assembly comprising a bobbin supported by the housing to surround the fixed and movable cores, and a coil wound around the bobbin, wherein a small strut for insert-connecting a proximal end of a coupler terminal is integrally formed on one end surface of the bobbin; wherein an outgoing line of the coil wound around the small strut is connected to the coupler terminal; and wherein on a coil cover molded on an outer periphery of the coil and the bobbin so as to seal the coil to the bobbin, there are integrally formed a coupler for holding the coupler terminal to protrude outward in a radial direction of the coil assembly and a protruded portion for enveloping the small strut to protrude from an end surface of the coil cover.

With the seventh feature, by molding the coil cover on the outer periphery of the coil and the bobbin so as to seal the coil to the bobbin, water resistance of the coil can be enhanced.

Moreover, since the coupler for holding the coupler terminal to protrude outward in the radial direction is integrally formed on the coil cover, both the lead wire to be connected to the coil and a coupler holder for supporting the coupler become unnecessary, so that the number of components and assembling steps are reduced and the cost can be reduced.

Also, a small strut for insert-connecting a proximal end portion of a coupler terminal is integrally formed on one end surface of the bobbin; an outgoing line of the coil wound around the small strut is connected to the coupler terminal; and a protruded portion for enveloping the small strut to protrude from an end surface of the coil cover is formed integrally with the coil cover together with the coupler. Therefore, by winding the outgoing line of the coil around the small strut, it is possible to mold the coil cover, the coupler and the protruded portion, while reliably preventing the outgoing line from loosening.

Also, in addition to the seventh feature, according to an eighth feature of the present invention, the coupler is exposed to the outside through an aperture provided from the peripheral wall of the housing to the bottom wall, and the protruded portion is arranged within the aperture so as to be adjacent to the bottom wall.

With the eighth feature, the actuator can be constructed compactly without the need for providing any accommodating space for the protruded portion in the housing, and without overhanging the protruded portion over the outer surface of the housing.

The connecting means corresponds to a connecting bolt 55, an adjustment nut 56 and a set spring 57 in an embodiment of the present invention to be described later. Also, the first yoke and the second yoke correspond to an upper yoke 35 and a lower yoke 36 respectively.

The above-mentioned object, other objects, characteristics, and advantages of the present invention will become apparent from an explanation of a preferred embodiment, which will be described in detail below by reference to the attached drawings.

DESCRIPTION OF THE PREFERRED EMBODIMENTS

Figure 1:
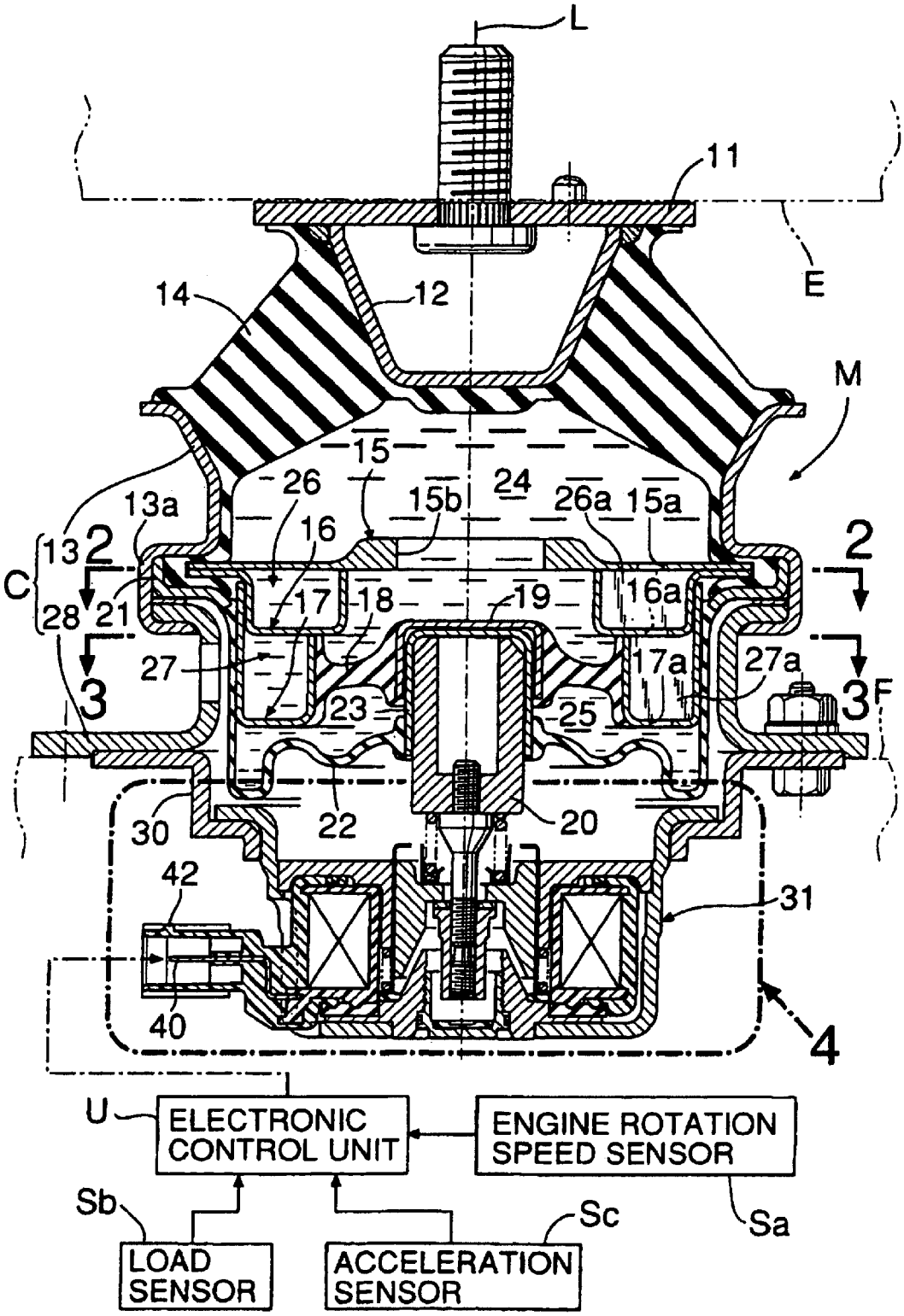
FIG. 1 is a longitudinal section showing an active type vibration isolating support system having an electromagnetic actuator according to the present invention.
Figure 2:
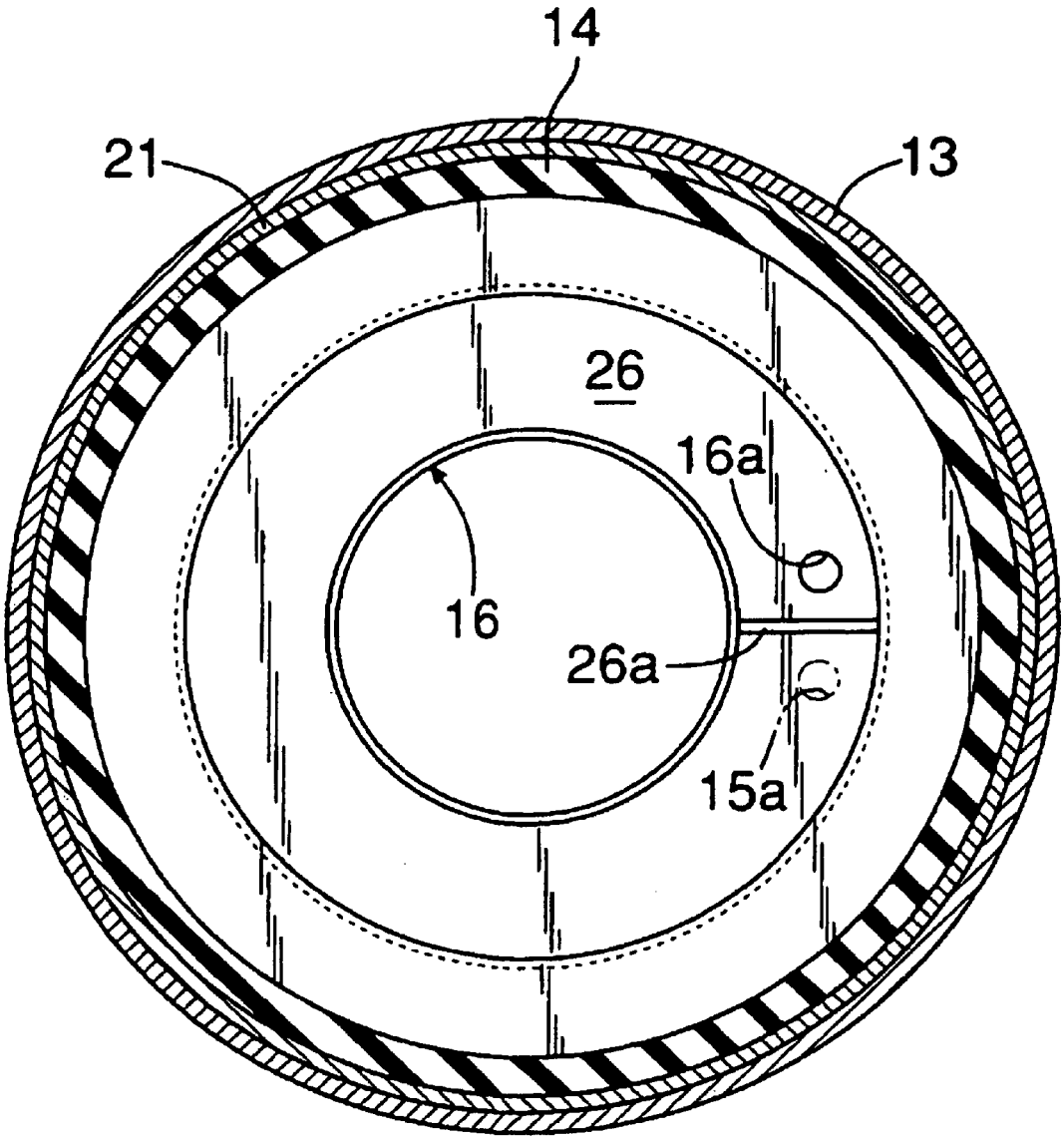
FIG. 2 is a sectional view taken on line 2—2 in FIG. 1.
Figure 3:
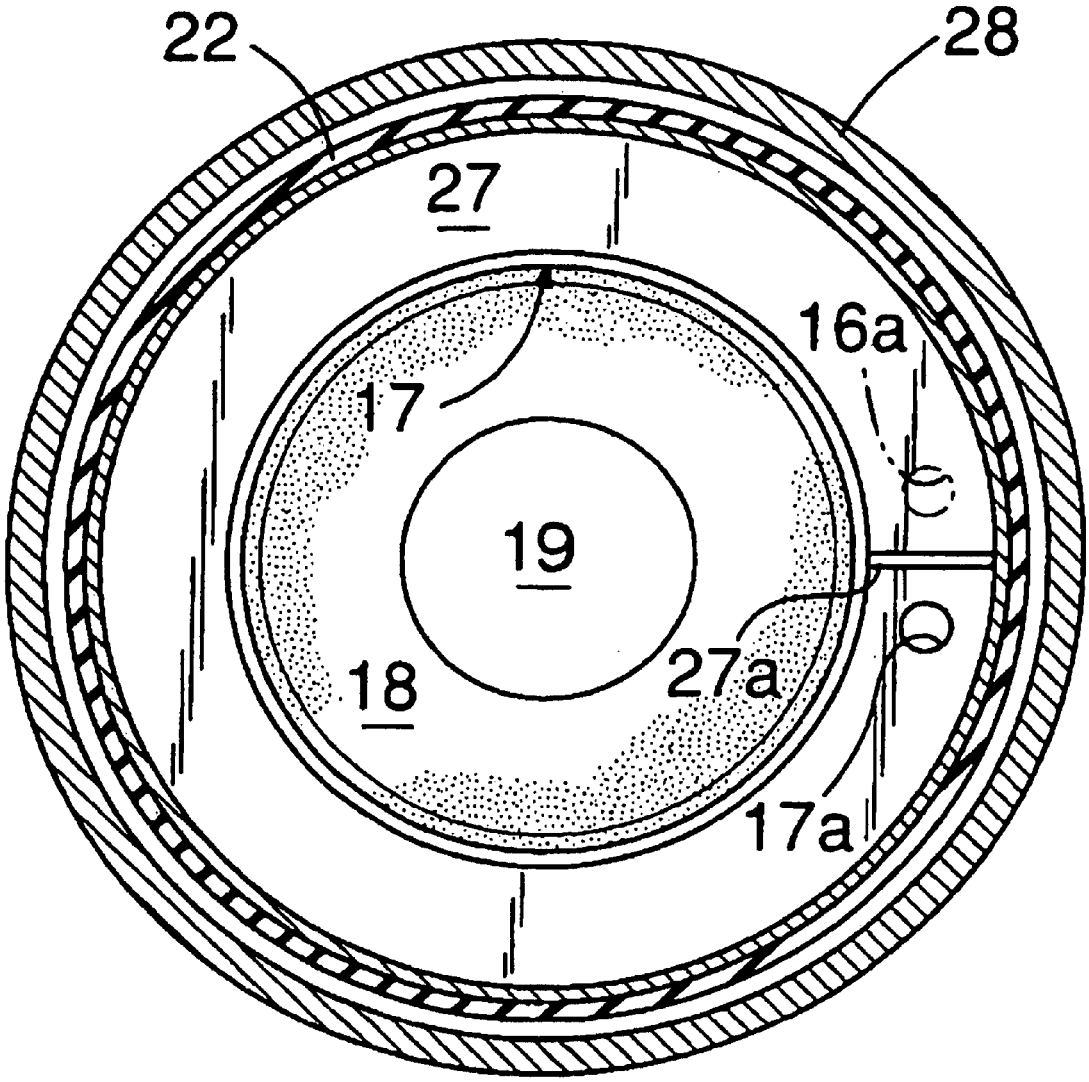
FIG. 3 is a sectional view taken on line 3—3 in FIG. 1.

Hereinafter, the preferred embodiments of the present invention will be described by reference to the attached drawings. First, a first embodiment of the present invention shown in FIG. 1 to FIG. 4 will be described. In FIG. 1, an active type vibration isolating support system M is, in order to elastically support the engine E on the body frame F in an automobile, interposed therebetween.

The active type vibration isolating support system M has actually axisymmetric structure with respect to an axis L, and has a plate-shaped installation bracket 11 to be connected to the engine E; an inner tube 12 welded to this installation bracket 11; an outer tube 13 which is coaxially arranged around an outer periphery of this inner tube 12; and a first elastic body 14 made of thick rubber or the like to be vulcanized and bonded onto conical surfaces of these inner tube 12 and outer tube 13 which oppose to each other. Below this first elastic body 14, there are arranged a first orifice formation member 15, a second orifice formation member 16 and a third orifice formation member 17, which are arranged vertically and made integral with one another.

The first orifice formation member 15 is shaped like a disk, and has an aperture 15b at a center thereof. The second orifice formation member 16 is annular, having a gutter-shaped cross section, the upper surface of which has been opened, and is integrally joined with the first orifice formation member 15 so that the opened upper surface is closed by the first orifice formation member 15. The third orifice formation member 17 is also annular, having a gutter-shaped cross section, the upper surface of which has been opened, and is integrally joined with the second orifice formation member 16 so that the opened upper surface is closed by the second orifice formation member 16. Outer peripheral portions of the first and second orifice formation members 15, 16 are superimposed on to be made integral with each other, and are fixed to an annular crimping fixed portion 13a continuously provided below the outer tube 13.

On an inner peripheral surface of the third orifice formation member 17, an outer peripheral surface of the annular second elastic body 18 made of rubber or the like is vulcanized and bonded. On the inner peripheral surface of this second elastic body 18, there is vulcanized and bonded a first cap member 19 with the lower surface opened, arranged on the axis L. In this first cap member 19, a second cap member 23 and a movable member 20 are fixed by press-fitting in order. The second cap member 23 has its lower end portion protruding toward a lower place of the first cap member. 19. On the outer peripheral surface of this protruded portion, there is vulcanized and bonded an inner peripheral end portion of a diaphragm 22 arranged below the second elastic body 18. On the outer periphery of this diaphragm 22, a ring member 21 is vulcanized and bonded, and this ring member 21 is fixed to the crimping fixed portion 13a together with the outer peripheral portions of the first and second orifice formation members 15, 16. Because of deflection of the second elastic body 18 and the diaphragm 22, the movable member 20 is capable of moving up and down together with the first and second cap members 19, 23.

Thus, between the first elastic body 14 and the second elastic body 18, a first liquid chamber 24, in which liquid is sealed, is defined, and between the second elastic body 18 and the diaphragm 22, a second liquid chamber 25, in which liquid is likewise sealed, is defined. These first and second liquid chambers 24, 25 communicate with each other via an upper orifice 26 and a lower orifice 27 formed by the first to third orifice formation members 15 to 17.

The upper orifice 26 is defined over a little less than one round thereof between the first and second orifice formation members 15, 16 (See FIG. 2), and a partition wall 26a for constituting opposite end walls of the upper orifice 26 is welded between the first and second orifice formation members 15, 16. The upper orifice 26 communicates with the first liquid chamber 24 via a through-hole 15a in the first orifice formation member 15 on one side of the partition wall 26a, and communicates with the lower orifice 27 via a through-hole 16a in the second orifice formation member 16 on the other side of the partition wall 26a.

The lower orifice 27 is defined over a little less than one round thereof between the second and third orifice formation members 16, 17 (See FIG. 3), and a partition wall 27a for constituting both end walls of the lower orifice 27 is welded between the first and second orifice formation members 15, 16. The upper orifice 26 communicates with the upper orifice 26 via the through-hole 16a on one side of the partition wall 27a, and communicates with the second liquid chamber 25 via a through-hole 17a of the third orifice formation member 17 on the other side of the partition wall 27a. Therefore, the first and second liquid chambers 24, 25 are caused to communicate with each other via the upper and lower orifices 26, 27 which have been connected with each other in series.

To the crimping fixed portion 13a, a tube-shaped bracket 28 is also fixed, and this is fixed to the body frame F, whereby the active type vibration isolating support system M is installed to the body frame F. This tube-shaped bracket 28 and the outer tube 13 constitute a supporting casing C of the active type vibration isolating support system M.

To the tube-shaped bracket 28, an actuator supporting member 30 is fixed, and the electromagnetic actuator 31 for driving the movable member 20 is supported by this actuator supporting member 30.

Figure 4:
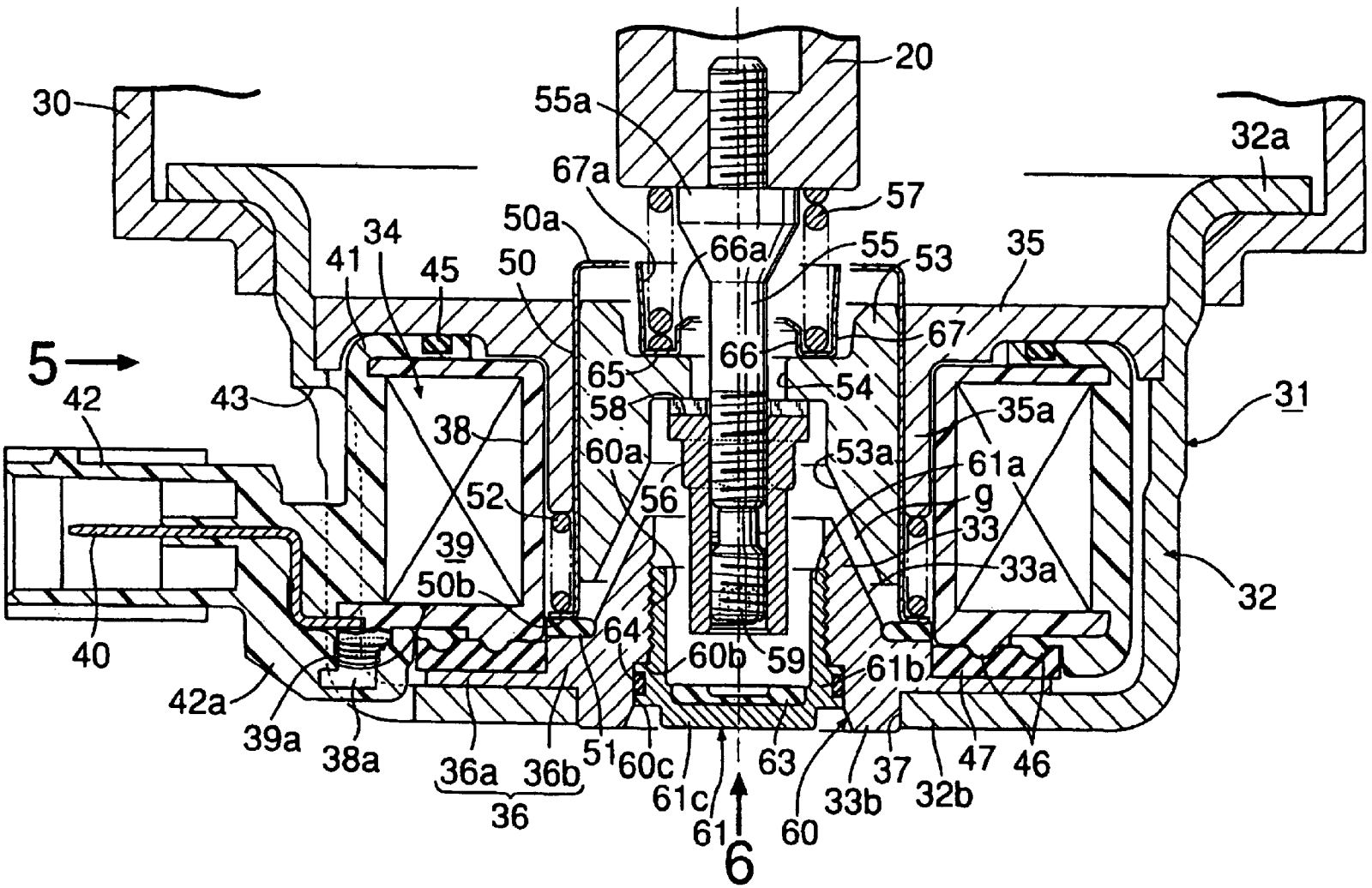
FIG. 4 is an enlarged view showing a part 4 in FIG. 1.

In FIG. 4, the actuator 31 has a closed-end tube-shaped housing 32 made of magnetic material, the upper surface of which has been opened, and a flange 32a formed at the upper end thereof is fixed to the actuator supporting member 30. The housing 32 is magnetic material, within which there are installed the fixed core 33, the coil assembly 34 and the upper yoke 35 in order. The fixed core 33 has an attracted surface 33a in an upper part thereof, a positioning shaft 33b protruding on an underside thereof, and a stepped collar-shaped lower yoke 36 formed at the outer periphery. The lower yoke 36 is brought into close contact with the bottom wall 32b of the housing 32 so that the positioning shaft 33b is pressed into the positioning hole 37 in the bottom wall 32b. Thus, the fixed core 33 is fixed to the housing 32.

The coil assembly 34 has a bobbin 38 made of synthetic resin to be arranged at the outer periphery of the fixed core 33, and a coil 39 to be wound around this bobbin 38. On the outer periphery of the lower flange of the bobbin 38, a small strut 38a protruding downward is projectingly provided. During molding of this small strut 38a, a proximal end portion of the coupler terminal 40 is insert-connected to the small strut 38a. Around the small strut 38a, an outgoing line 39a of the coil 39 is wound, the tip end of which is connected to the coupler terminal 40 by means of soldering, electric welding or the like.

Figure 5:
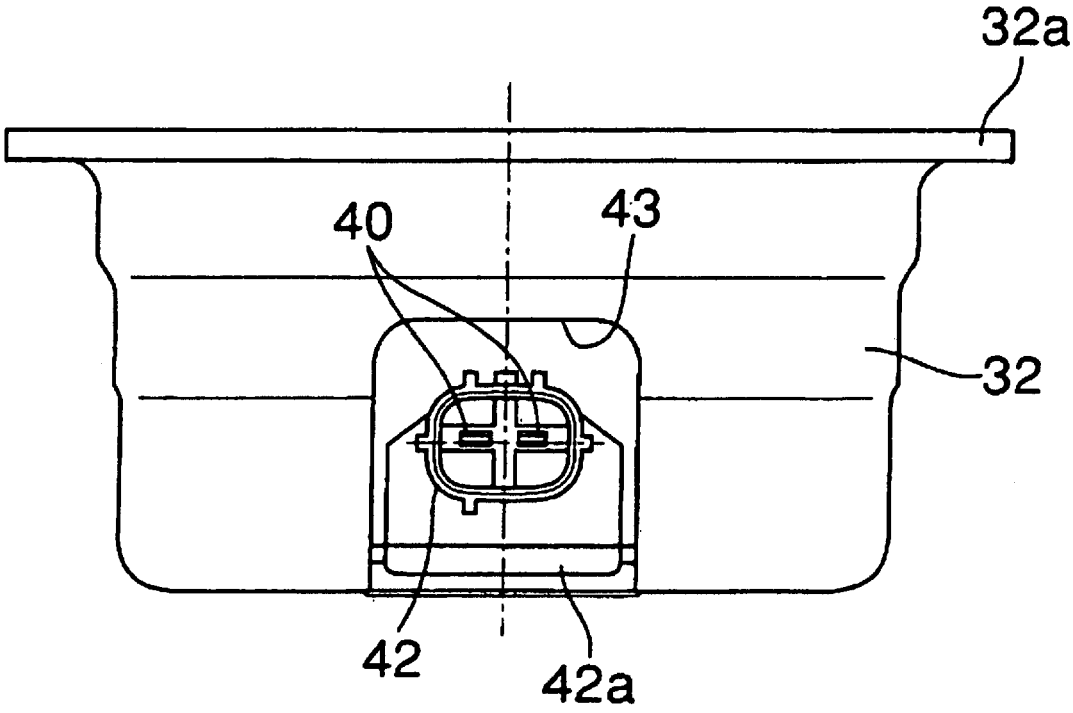
FIG. 5 is a view taken from arrow 5 in FIG. 4.
Figure 6:
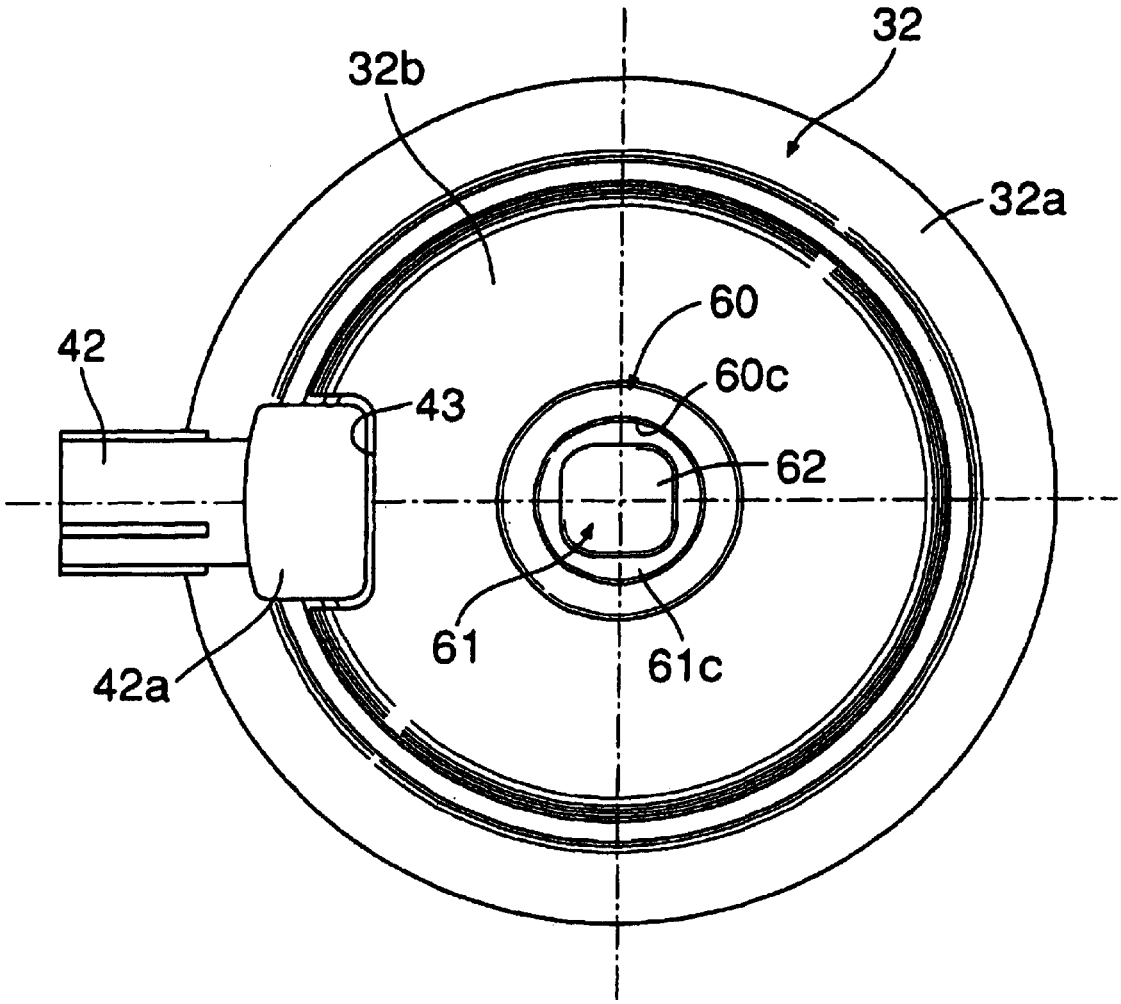
FIG. 6 is a view taken from arrow 6 in FIG. 4.

After the outgoing line 39a is connected to the coupler terminal 40, in order to seal the coil 39 to the bobbin 38, a tube-shaped coil cover 41 which comes into close contact from the upper and lower end surfaces of the bobbin 38 to the outer peripheral surface of the coil 39 is injection-molded using synthetic resin. On that occasion, on this coil cover 41, there are integrally formed a coupler 42 for holding the coupler terminal 40 to protrude outward in the radial direction of the cover 41, and a protruded portion 42a for enveloping the outgoing line 39a from the small strut 38a to protrude on the lower end surface of the cover 41. This coupler 42 is arranged so as to expose outside the housing 32 through an aperture 43 provided from the bottom wall 32b of the housing 32 to the peripheral wall (See FIGS. 5 and 6). The protruded portion 42a is arranged within the aperture 43 so as to be adjacent to the bottom wall 32b of the housing 32.

On the upper end surface of the coil assembly 34, particularly on the upper end surface of the coil cover 41, there is mounted an annular sealing member 45. Also, on the lower end surface of the coil assembly 34, particularly on the lower end surfaces of the bobbin 38 and the coil cover 41, a plurality of sealing convex ridges 46, 46 which surround the fixed core 33 for concentrically lining up are integrally formed. Between their lower end surfaces and thin outer peripheral portion 36a of the lower yoke 36, there is interposed an elastic plate 47. This elastic plate 47 is molded with elastic material such as NBR or silicone rubber.

The upper yoke 35 is fixed to the inner peripheral surface of the housing 32 by press-fitting in order to press and hold the coil assembly 34 toward the lower yoke 36. With the fixing, the sealing member 41 and the elastic plate 47 are compressed, whereby the coil assembly 34 is elastically supported without looseness between the upper yoke 35 and the lower yoke 36, so that vibration resistance of the coil assembly 34 and water resistance of the coil 39 are improved. Particularly, since the sealing convex ridges 46, 46 of the bobbin 38 and the coil cover 41 on the lower end surface cut into the upper surface of the elastic plate 47 to further reliably seal the elastic plate 47, when rain water or washing water enters the aperture 43 from the outside to accumulate at the bottom of the housing 32, even if contact between the coil cover 41, and the coil 39 and the bobbin 38 is insufficient, it is possible to reliably prevent water from entering the inner periphery side of the bobbin 38, to say nothing of entering the coil 39 side.

On the inner peripheral surface of a cylindrical portion 35a to be arranged on the inner periphery of the bobbin 38 of the upper yoke 35, a thin tube-shaped bearing member 50 is slidably fitted. At the upper end of this bearing member 50, an inwardly-facing flange 50a pointing inwardly in the radial direction is integrally formed, while at the lower end thereof, an outwardly-facing flange 50b pointing outwardly in the radial direction is integrally formed. The outwardly-facing flange 50b is superimposed on the thick inner peripheral portion 36b of the lower yoke 36 through the annular elastic plate 51, and between this outwardly-facing flange 50b and the fixed core 33, a set spring 52 made of coil spring is provided in a compressed state, whereby the bearing member 50 is elastically held on the lower yoke 36 for vibration isolation.

Also, when the movable core 53 descends on the fixed core 33 side, the elastic plate 51 also serves as a descending stopper for the movable core 53, which receives the lower end of the movable core 53 as a cushion in order to avoid collision between both cores 33, 53 and defines a descending limit thereof.

Slidably fitted to the bearing member 50 is the movable core 53 having an attracted surface 53a opposed to an attracted surface 33a of the fixed core 33 through the air gap 2. The upper end of a connecting bolt 55 which loosely penetrates a comparatively large-diameter through-hole 54 opened at the central part of this movable core 53 is threadably attached to the movable member 20. At the lower end portion of the connecting bolt 55, an adjustment nut 56 of the movable core 53 for supporting the lower end surface around the through-hole 54 is threadedly engaged. On that occasion, the set spring 57 for holding the movable core 53 at a supporting position by the adjustment nut 56 is provided between the movable member 20 and the movable core 53 in a compressed state. Thus, the movable core 53 is elastically interposed between the set spring 57 and an adjustment nut 56 threadedly engaged with the connecting bolt 55 made integral with the movable member 20. On the upper end surface of the adjustment nut 56 held in press contact with the movable core 53, a radial ventilating groove 58 communicating with the through-hole 54 is formed in such a manner that when the movable core is moving up and down, air can be smoothly circulated in space above and below it.

Thus, if a threaded position of the adjustment nut 56 with the connecting bolt 55 is advanced and retreated, up and down positions of the movable core 53, that is, the air gap g between attracted surfaces 33a and 53a of the movable core 53 and the fixed core 33 can be adjusted by corporation with the set spring 57. An adjustment position of the adjustment nut 56 is threadedly engaged with and tightly fastened from below by the adjustment nut 56, and is fixed by a lock screw 59.

Figure 7:
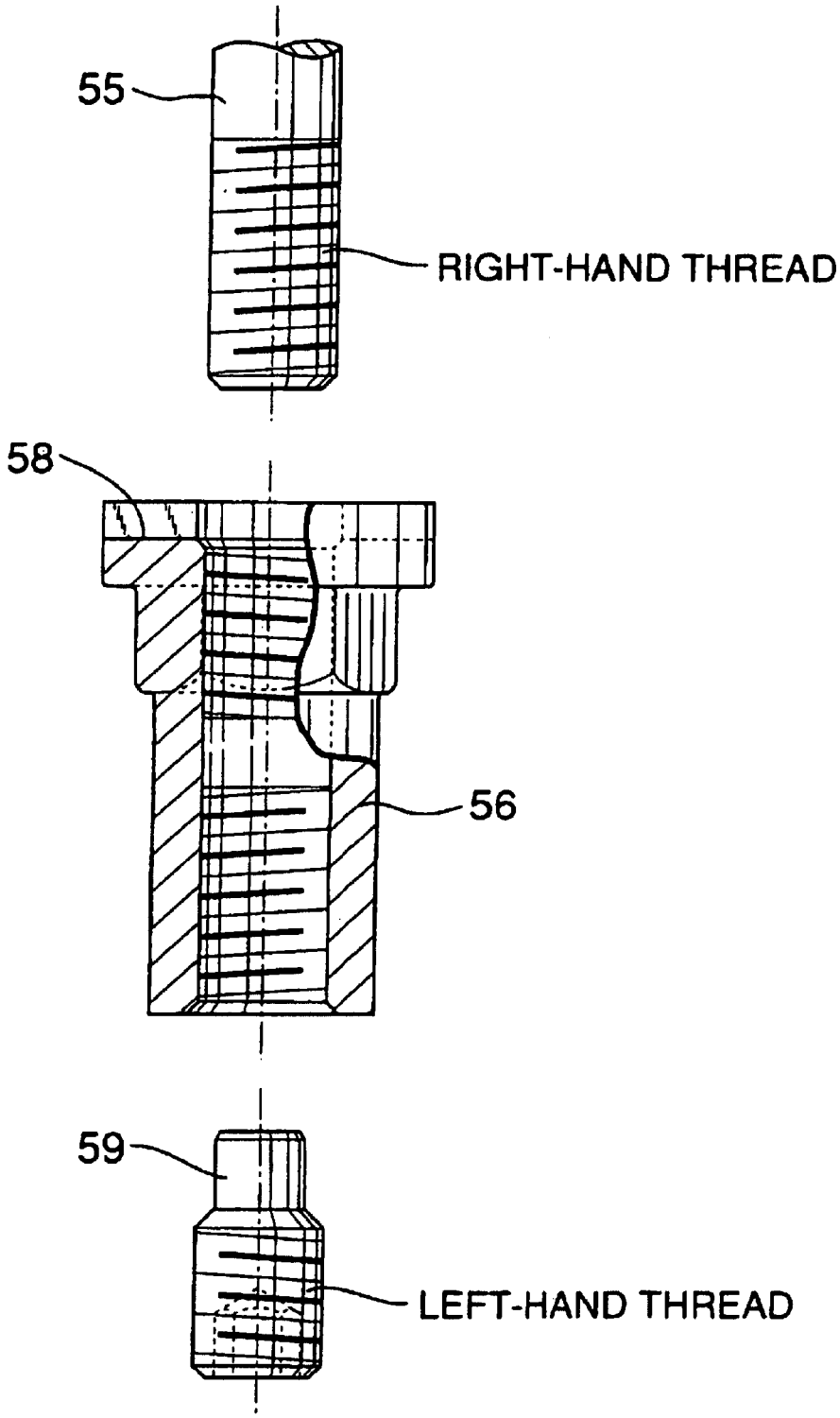
FIG. 7 is a perspective view showing an adjustment nut in FIG. 4.
Figure 8:
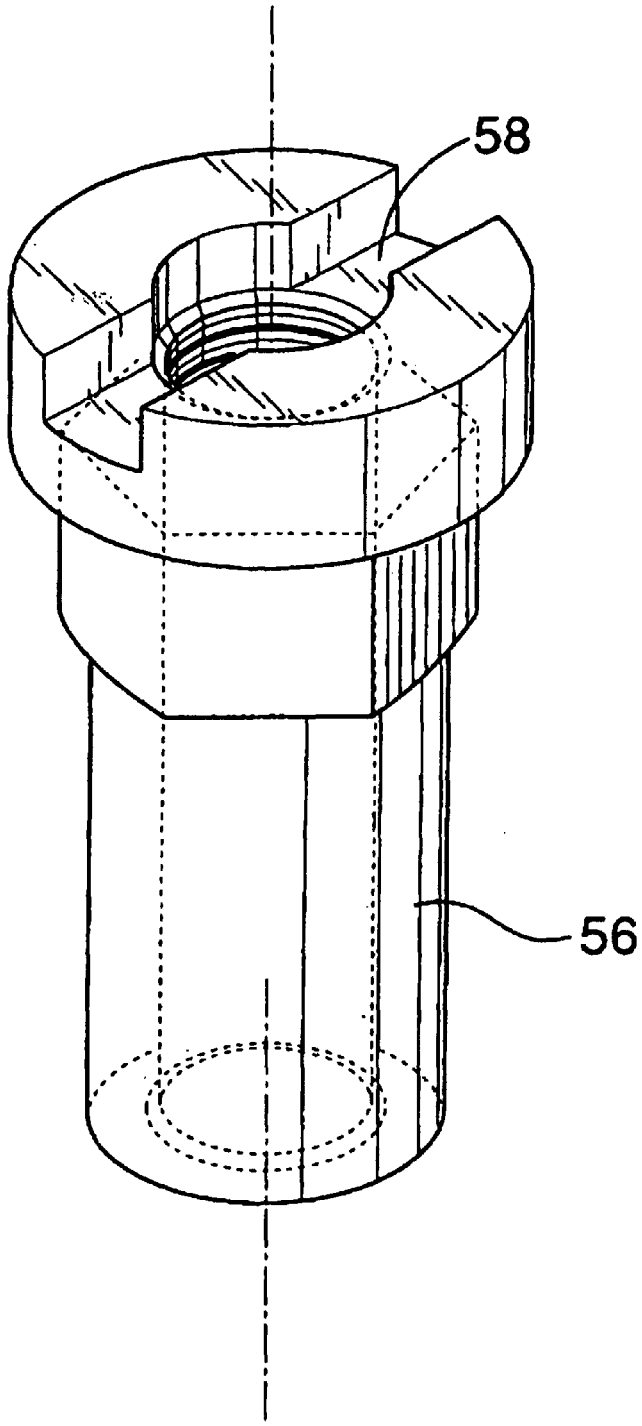
FIG. 8 is a longitudinal section of an exploded side view showing the adjustment nut, a connecting bolt and a lock screw.

As shown in FIGS. 7 and 8, a threaded portion of the connecting bolt 55 has a normal right-hand thread, whereas in the threaded portion of the lock screw 59, a left-hand thread is formed. Therefore, if in a state in which the adjustment nut 56 is held at a predetermined adjustment position by a tool, the lock screw 59 is fastened in by another tool, torque of the lock screw 59 is transmitted to the 5 connecting bolt 55 through friction so that the connecting bolt 55 is drawn in on the lock screw 59 side. Therefore, it is possible to reliably lock at the adjustment position of the adjustment nut 56.

At the central portion of the fixed core 33, an adjustment operating hole 60 for allowing the adjustment nut 56 to go in and out is provided, and by means of a tool inserted into this adjustment operating hole 60, the lock screw 59 and the adjustment nut 56 are adapted able to be operated. The adjustment operating hole 60 is composed of a threaded hole 60a and a fitting hole 60c having a diameter larger than that of the threaded hole 60a, continuing to the lower end of the threaded hole 60a through an annular shoulder portion 60b. On the other hand, a peg body 61 closing the adjustment operating hole 60 is shaped like a bottomed tube with its upper end opened, and has a threaded tube 61a to be threadedly engaged with the threaded hole 60a while receiving the adjustment nut 56, a collar portion 61b to be fitted in a fitting hole 60c, and a bottom portion 61c. On the outer periphery of the collar portion 61b, there is mounted a sealing member 64 which comes into close contact with the inner peripheral surface of the fitting hole 60c. At the underside of the bottom portion 61c, there is formed a polygonal tool engaging projection 62.

Until the collar portion 61b fitted in the fitting hole 60c abuts against the shoulder portion 60b, the threaded tube 61a is threadedly engaged with and tightly fastened to the threaded hole 60a, whereby the adjustment operating hole 60 can be closed water tightly by the peg body 61.

On the upper surface of the bottom portion 61c of this peg body 61, the elastic plate 63 is bonded, and the bottom portion 61c receives the lower end of the adjustment nut 56 through this elastic plate 63 as a cushion to define a descending limit of the movable member 20. However, when the adjustment nut 56 abuts against the bottom portion 61c of the peg body 61, the movable member 20 further descends while the movable member 20 compresses the set spring 57 after the movable core 53 reaches the above-described descending limit by descending of the movable member 20.

Within the bearing member 50, each of attracted surfaces 33a, 53a of the fixed core 33 and the movable core 53 which oppose to each other is formed in a conical surface so as to define a conical tube-shaped air gap g therebetween, and is arranged so that the attracted surface 53a of the movable core 53 surrounds the attracted surface 33a of the fixed core 33. Therefore, even in the fixed core 33 and the movable core 53 within the bearing member 50, each having a comparatively small diameter within the bearing member 50, it is possible to acquire a comparatively strong attraction force and a comparatively long stroke of the movable core 53.

Moreover, since the attracted surface 53a of the movable core 53 is to be formed on the inner peripheral surface side of the core 53, a supporting span of the movable core 53 by the bearing member 50 can be secured sufficiently long irrespective of the attracted surface 53a, and stable ascent and descent of the movable core 53 can be ensured. In this case, it is effective in acquiring further stable, smooth ascent and descent of the movable core 53 that the outer peripheral surface of the movable core 53 is formed with a low friction material layer made of Teflon or the like.

The set spring 57 is made of coil spring, and by fitting it to a large-diameter portion 55a at the base of the connecting bolt 55, the set spring 57 is arranged concentrically with the connecting bolt 55. Also, between this set spring 57 and the movable core 53, there is interposed an annular spring seat 65 made of steel plate in order to prevent the movable core 53 from wearing. This spring seat 65 has inner and outer concentric positioning tubular portions 66, 67 which stand up along the inner peripheral surface and outer peripheral surface of the set spring 57 from the inner peripheral edge portion and outer peripheral edge portion, and the outside positioning tubular portion 67 is formed longer than the inside positioning tubular portion 66. In order to facilitate insertion of the set spring 57 between these positioning tubular portions 66, 67, there are formed funnel portions 66a, 67a at the upper end portions of the positioning tubular portions 66, 67. Also, on at least one of abutted surfaces in which this spring seat 65 and the movable core 53 oppose to each other, a low friction material layer of Teflon or the like is formed to thereby make sliding property of the spring seat 65 to the movable core 53 excellent.

Referring to FIG. 1, to a coil 39 of the actuator 31, an electronic control unit U is connected through a coupler 42, and to this electronic control unit U, there is inputted each detection signal of a rotation speed sensor Sa for detecting engine rotation speed, a load sensor Sb for detecting a load to be inputted into an active type vibration isolating support system M, and an acceleration sensor Sc for detecting acceleration that is exerted on an engine E.

Next, the description will be made of an operation of this embodiment.

When the actuator 31 of the active type vibration isolating support system M is in a non-operating state, although the first and second liquid chambers 24, 25 which communicate with each other through the upper and lower orifices 26, 27 are kept at the same pressure, since a pressure receiving area in the fist liquid chamber 24 of the first cap member 19 connected to the movable member 20 is larger than a pressure receiving area in the second liquid chamber 25, a downward load obtained by multiplying the difference in area by pressure in the first liquid chamber 24 is exerted on the movable member 20. When a balance is established between the load and a repulsion force of the second elastic body 18 against it, the movable member 20 comes to a halt, forming a predetermined initial air gap g between adsorption surfaces 33a, 53a of the fixed core 33 and the movable core 53.

When shake vibration of low frequency occurs in the engine E during running of an automobile, the first elastic body 14 is deformed because of a load inputted from the engine E to change capacity of the first liquid chamber 24. Then, the liquid goes and comes between the first and second liquid chambers 24, 25 which communicate with each other through the upper and lower orifices 26, 27. When the capacity of the first liquid chamber 24 is enlarged and reduced, the capacity of the second liquid chamber 25 is reduced and enlarged accordingly, and the variations in capacity of this second liquid chamber 25 are absorbed by elastic deformation of a diaphragm 22. At this time, since shapes and dimensions of the upper and lower orifices 26, 27 and spring constant of the first elastic body 14 have been set so as to show high spring constant and a high attenuation force in a frequency domain of the shake vibration, vibration to be transmitted from the engine E to the body frame F can be effectively reduced.

In such a shake vibration domain of low frequency of the engine E, the actuator 31 is kept in a non-operating state.

When vibration of a frequency higher than the shake vibration, that is, idle vibration or booming noise vibration that occurs during idling of the engine E occurs, liquid within the upper and lower orifices 26, 27 which connect the first and second liquid chambers 24, 25 enters a stick state, so that the engine E becomes unable to exhibit a vibration isolating function. In such a case, the actuator 31 is driven to exhibit the vibration isolating function.

In other words, the electronic control unit U controls energizing to a coil 39 of the actuator 31 on the basis of a detection signal inputted from the engine rotation speed sensor Sa, the load sensor Sb, the acceleration sensor Sc and the like. Specifically, when the engine E leans is displaced downward because of vibration and the capacity of the first liquid chamber 24 is reduced due to the downward deformation of the first elastic body 14 to raise the liquid pressure, the coil 39 is energized to attract the movable core 53 on the fixed core 33 side. As a result, the movable core 53 descends while deforming the second elastic body 18 so that the capacity of the first liquid chamber 24 is enlarged, whereby it is possible to restrict the rise in pressure in the chamber 24, and after all, the active type vibration isolating support system M generates an active supporting force for preventing the downward load from the engine E to the body frame F from being transmitted.

On the other hand, when the engine E is displaced upward and the capacity of the first liquid chamber 24 is enlarged to raise the pressure in the chamber 24, the coil 39 is demagnetized to release the movable core 53. As a result, the movable core 53 rises due to the repulsion force of the second elastic body 18 so that the capacity of the first liquid chamber 24 is reduced, whereby it is possible to restrict the drop in pressure in the chamber 24, and after all, the active type vibration isolating support system M generates an active supporting force for preventing the upward load from the engine E to the body frame F from being transmitted.

During such an operation, when with an excessive increase in the downward load from the engine E to the first elastic body 14, the pressure in the fist liquid chamber 24 is abruptly increased to apply the excessive downward load to the movable member 20, the movable member 20 first descends the movable core 53 to its descent limit, that is, until the lower end surface of the core 53 is abutted against the elastic plate 51 on the thick inner peripheral portion 36b of the lower yoke 36. Thereafter, the set spring 57 is compressed and becomes deformed so that the adjustment nut 56 is moved away from the underside of the movable core 53, whereby the movable member 20 is allowed to further move toward the fixed core 33 side. Accordingly, by causing the set spring 57 to absorb the excessive load of the movable member 20, it is possible to prevent mutual contact between the fixed core 33 and the movable core 53, and the excessive load acting on the movable core 53 and the elastic plate 51, and to secure their durability.

Thus, if after the movable core 53 reaches the descent limit, the movable member 20 descends by a predetermined amount, the adjustment nut 56 will abut against a bottom portion 61c of the peg body 61 fixed to the fixed core 33 through the elastic plate 63 to restrict any excessive increase in the load on the set spring 57, thereby preventing any increase in over-load on the fixed core 33 and the movable core 53.

Characteristics in thrust and displacement of the movable member 20 of the active type vibration isolating support system M are dependent on an initial air gap g between attracted surfaces 33a, 53a of the fixed core 33 and the movable cores 33, 53 in a non-operating state of the actuator 31. However, the initial air gap g may not be within the tolerance due to accumulated manufacturing errors of each portion from the installation area of the second elastic body 18 to the movable core 53. In such a case, a threaded position of the adjustment nut 56 with respect to the connecting bolt 55 is advanced and retreated as described above, whereby the initial air gap g can be adjusted properly and easily. Therefore, by energizing the coil 39, it becomes possible to impart predetermined thrust and displacement to the movable member 20 with high precision, to thereby improve the performance of the active type vibration isolating support system M.

Also, if plural types of active type vibration isolating support systems M having different initial air gaps g between the fixed core 33 and the movable cores 33, 53 are prepared by operating the adjustment nut 56, it will be possible to easily obtain active type vibration isolating support systems M having characteristics corresponding to plural car models, thereby contributing to reduction of cost.

Moreover, since the adjustment nut 56 is operated through the adjustment operating hole 60 of the fixed core 33 opened outside the housing 32, the initial air gap g can be accurately adjusted without regard to assembly errors in each portion after the completion of assembly of the active type vibration isolating support system M.

Although the fixed core 33 becomes hollow because it has the adjustment operating hole 60, the positioning shaft 33b integral therewith is pressed into the positioning hole 37 in the bottom wall 32b of the housing 32 and the flange-shaped lower yoke 36 is brought into close contact with the bottom wall 32b, whereby the fixed core 33 is firmly reinforced, and even if it receives an abutting shock from the movable core 53, is capable of withstanding the shock sufficiently and besides causes no position shift. Moreover, since the lower yoke 36 effectively increases magnetic paths around the coil assembly 34 in cooperation with the housing 32 and the upper yoke 35, the attracting force between the fixed and movable cores 33, 53 can be increased.

On the other hand, an ascent limit of the movable core 53 is defined by its upper end abutting against an inward flange 50a of the bearing member 50. When the movable core 53 abuts against the inward flange 50a shockingly, the impulse force is transmitted to the set spring 52 through the bearing member 50 and the outward flange 50b, to be absorbed by the elasticity of the set spring 52. Therefore, the set spring 52 also serves as an impulse absorbing member which protects the movable core 53 and the bearing member 50 from the impulse force.

Since the movable core 53 is elastically held on the adjustment nut 56 by the set spring 57 and an adequate play is provided between the inner surface of the through-hole 54 in the movable core 53 and the connecting bolt 55, the movable core 53 and the connecting bolt 55 are capable of relatively oscillating. Therefore, when during an operation of the active type vibration isolating support system M, a load in an inclined direction is applied to the movable member 20, it is possible to prevent the movable core 53 from inclining for maintaining a good sliding relationship with the bearing member 50 by means of the oscillation of the connecting bolt 55. In this case, with the oscillation of the connecting bolt 55, the set spring 57 moves sideways more or less, however, between this set spring 57 and the movable core 53, there is interposed a spring seat 65 for holding the lower end portion of the set spring 57, and yet, on an abutted surface between the spring seat 65 and the movable core 53, there is formed a low friction material layer. Thus, the spring seat 65 smoothly slides on the upper surface of the movable core 53 along with the set spring 57, thereby effectively suppressing production of abrasion powder from the movable core 53. Therefore, it is possible to prevent trouble resulting from the abrasion powder, in such a case where the abrasion powder enters sliding portions of the bearing member 50 and the movable core 53 to hinder the movement of the movable core 53.

With very simple structure in which a set spring 52 is provided in a compressed state between the outward flange 50b at the lower end of the bearing member 50 and the upper yoke 35, the bearing member 50 is installed at a fixed position on the lower yoke 36. Therefore, no high precision is needed for the installation, and the cost can be reduced. Moreover, since the set spring 52 is to be arranged on the outer periphery side of the bearing member 50, even if friction powder occurs between this set spring 52 and a portion against which the set spring 52 presses, it is possible to prevent the friction powder from entering the bearing member 50. Particularly since between the outward flange 50b and the lower yoke 36, there is interposed an elastic plate 51 which is brought into close contact with them, it is possible to reliably prevent the friction powder from entering the bearing member 50 by the elastic plate 51, and the bearing member 50 is capable of exhibiting excellent guidance property for the movable core 53 over a long period of time.

Also, since a repulsion force of the set spring 52 is supported by the upper yoke 35 continuing to the housing 32 and is not exerted on the movable core 53, it is possible to prevent loss of an effective attracting force between the fixed and movable cores 33, 53 due to the repulsion force of the set spring 52, thereby improving the output performance of the movable core 53.

In the coil assembly 34, since there is molded a coil cover 41 which is brought into close contact with outer peripheral surfaces of the coil 39 and the bobbin 38 so as to seal the coil 39 to the bobbin 38, it is possible to enhance water resistance of the coil 39. Moreover, since on the coil cover 41, there has been integrally formed a coupler 42 for holding the coupler terminal 40 to protrude outward in the radial direction, there is no need for a lead wire to be connected to the coil 39 and a coupler holder for supporting the coupler, so that a number of components and assembly man-hour are reduced, and the cost can be reduced.

Also, on one end surface of the bobbin 38, there is integrally formed a small strut 38a for insert-connecting a proximal end portion of the coupler terminal 40; around this small strut 38a, there is wound an outgoing line 39a of the coil 39 to be connected to the coupler terminal 40; and thereafter, a protruded portion 42a for enveloping the small strut 38a and the outgoing line 39a to protrude from the lower end surface of the coil cover 41 is integrally formed with the coil cover 41 together with the coupler 42. Therefore, the outgoing line 39a of the coil 39 is wound around the small strut 38a, whereby it is possible to mold the coil cover 41, the coupler 42 and the protruded portion 42a while reliably preventing the outgoing line 39a from loosening.

When the coupler 42 is further exposed to the outside through an aperture 43 provided from the peripheral wall of the housing 32 over to the bottom wall 32b, the protruded portion 42a is arranged at the aperture 43 so as to be adjacent to the bottom wall 32b. Therefore, there is no need for the provision of accommodation space for the protruded portion 42a in the housing 32, and the protruded portion 42a needs not be overhung over the outer surface of the housing 32, whereby the actuator 31 can be made compact.

The present invention is not limited to the above-described embodiment, but it is possible to change the design in various ways without departing from the gist of the invention. For example, in the above-described embodiments, the movable member 20 and the connecting bolt 55 are integrated by forming them as separate members and threadably connecting together, but the members 20, 55 may be integrally constructed from the same material. Also, the fined portion between the positioning shaft 33b of the fixed core 33 and the positioning hole 37 in the bottom wall 32b of the housing 32 may be fixed by welding instead of press-fitting.

What is claimed is:

1. An electromagnetic actuator comprising:

a fixed core supported by a bottom wall of a housing made of magnetic material;

a movable core arranged opposite to the fixed core via an air gap to drive a movable member; and a coil assembly comprising a bobbin supported by the housing to surround the fixed and movable cores, and a coil wound around the bobbin, wherein the movable member and the movable core are coupled by coupling means for adjusting the air gap between the fixed core and the movable core, wherein an adjustment operating hole through which the coupling means is adjusted is provided on the fixed core to be opened from outside the bottom wall of the housing, and wherein the coupling means comprises a connecting bolt integral with the movable member, and an adjustment nut mounted at a lower end portion of the connecting bolt for advancing and retreating movements relative to the connecting bolt through threaded engagement therebetween, wherein adjustment of a threaded position of the adjustment nut on the connecting bolt adjusts a position of the movable core relative to the fixed core.

2. The electromagnetic actuator according to claim 1, wherein the fixed core is integrally formed with a positioning shaft in which the adjustment operating hole is opened on an outer end surface and with a flange-shaped first yoke which protrudes from the outer periphery of the fixed core to be arranged opposite to one end surface of the coil assembly; the positioning shaft is fitted and fixed into a positioning hole provided at the bottom wall of the housing; the first yoke is brought into close contact with an inner surface of the bottom wall to surround the movable core; and a second yoke arranged opposite to the other end surface of the coil assembly is continuously provided to the housing.

3. The electromagnetic actuator according to claim 2, wherein the bobbin is continuously provided with a coil cover which covers the outer periphery of the coil to seal the coil to the bobbin; the housing is arranged so that its bottom wall faces downward; and between the first yoke and the other end surfaces of the bobbin and the coil cover, there is interposed an elastic plate which watertightly comes into contact with their opposite surfaces.

4. The electromagnetic actuator according to claim 1, wherein the fixed core is integrally formed with a flange-shaped first yoke which protrudes from an outer periphery of the fixed core to be arranged opposite to one end surface of the coil assembly and which is supported on the bottom wall of the housing; a second yoke which surrounds the movable core and is arranged opposite to the other end surface of the coil assembly is fixed to the housing; a tube-shaped bearing member which slidably supports the movable core is slidably fitted in the second yoke; and a set spring is provided in a compressed state between the second yoke and an outward flange which is formed at a lower end of the bearing member and which is supported on the first yoke, thereby biasing the outward flange toward the first yoke.

5. An electromagnetic actuator comprising:

a fixed core supported by a bottom wall of a housing made of magnetic material;

a movable core arranged opposite to the fixed core via an air gap to drive the movable member;

a coil assembly, comprising a bobbin supported by the housing to surround the fixed and movable cores, and a coil wound around the bobbin; and a tube-shaped bearing member disposed inside the coil assembly to slidably support the movable core, wherein a first yoke for holding the coil assembly in corporation with the bottom wall is continuously provided to the housing;

wherein the bearing member is slidably fitted in the first yoke;

wherein a supporting portion for supporting an outward flange formed at one end of the bearing member is provided on the bottom wall; and wherein a set spring for biasing the outward flange toward the supporting portion is provided in a compressed state between the outward flange and the first yoke.

6. The electromagnetic actuator according to claim 5, wherein the fixed core is integrally formed with a positioning shaft fitted and fixed in a positioning hole provided on the bottom wall and with a second yoke which comes into close contact with an inner surface of the bottom wall and opposes to the first yoke with the coil assembly sandwiched therebetween, and the second yoke constitutes the supporting portion.

7. The electromagnetic actuator according to claim 1, wherein a lock screw is threaded into the adjustment nut and abuts against a lower end of the connecting bolt.

*8. An electromagnetic actuator for an active vibration isolating support system, comprising:*

*a movable core connected via a connecting device to a movable member of the active vibration isolating support system; and*

*a coil which is excited to form a magnetic circuit for operating the movable core in a direction to drive the movable member,*

*wherein the connecting device includes a connecting bolt which is secured to the movable member, and an adjustment nut which is threadedly engaged with the connecting bolt while supporting an end surface of the movable core, and*

*wherein adjustment of a threadedly engaged position of the adjustment nut with the connecting bolt enables adjustment of an initial position of the movable core, and*

*wherein a lock screw is threadedly engaged with the adjustment nut to fix it at an adjusted position thereof.*

*9. The electromagnetic actuator for an active vibration isolating support system according to claim 8, wherein a thread direction of the connecting bolt and a thread direction of the lock screw are opposite from each other with respect to the adjustment nut.*

*10. The electromagnetic actuator for an active vibration isolating support system according to claim 8, wherein the connecting bolt is integrally formed with the movable member and formed of a same material as of the latter.*

*11. An electromagnetic actuator for an active vibration isolating support system, comprising:*

*a movable core connected via a connecting device to a movable member of the active vibration isolating support system; and*

*a coil which is excited to form a magnetic circuit for operating the movable core in a direction to drive the movable member,*

*wherein the connecting device includes a connecting bolt which is secured to the movable member, and an adjustment nut which is threadedly engaged with the connecting bolt while supporting an end surface of the movable core, and*

*wherein a closed-end tube-shaped housing is provided for supporting the coil and an adjustment operating hole is provided in the housing for an adjusting operation of the connecting device.*

*12. The electromagnetic actuator for an active vibration isolating support system according to claim 11, wherein the connecting bolt is integrally formed with the movable member and formed of a same material as of the latter.*

* * * * *